US011050964B1

United States Patent
McGrath et al.

(10) Patent No.: US 11,050,964 B1
(45) Date of Patent: Jun. 29, 2021

(54) SENSOR READOUT WITH TIMESTAMP CALIBRATION

(71) Applicant: BAE SYSTEMS Information and Electronic Systems Integration Inc., Nashua, NH (US)

(72) Inventors: Robert Daniel McGrath, Lexington, MA (US); Dimitre P. Dimitrov, Wayland, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 11 days.

(21) Appl. No.: 16/748,338

(22) Filed: Jan. 21, 2020

(51) Int. Cl.
  *H04N 5/376* (2011.01)
  *H04N 5/378* (2011.01)

(52) U.S. Cl.
  CPC ........... *H04N 5/3765* (2013.01); *H04N 5/378* (2013.01)

(58) Field of Classification Search
  None
  See application file for complete search history.

(56) References Cited

U.S. PATENT DOCUMENTS 9,817,507 B2 * 11/2017 Park ...................... G06F 3/0416

OTHER PUBLICATIONS

Laurent Fesquey et al, Low-Power Event-Driven Image Sensor Architectures, First International Conference on Advances in Signal, Image and Video Processing, Jun. 26-30, 2016, Lisbon, Portugal.

* cited by examiner

*Primary Examiner* — Mark T Monk
(74) *Attorney, Agent, or Firm* — Maine Cernota & Rardin

(57) ABSTRACT

Devices and methods of minimizing the temporal error between pixels or groups of pixels on a focal plane array involving, on a focal plane array comprising at least two pixels or groups of pixels, at least one counter or ramp, and at least one trigger: determining the timing error associated with a time stamp associated with the at least two pixels or groups of pixels; storing the timing error associated with the at least two pixels or groups of pixels and the pixel or pixel group location; and using the stored timing error and pixel or pixel group location to correct subsequent time stamps associated with the at least two pixels or groups of pixels, wherein the timing error corresponds to a systematic error between the trigger and the counter or ramp value due to the location of a pixel or group of pixels on the focal plane array.

21 Claims, 6 Drawing Sheets

SENSOR READOUT WITH TIMESTAMP CALIBRATION

FIELD OF THE DISCLOSURE

The following disclosure relates generally to imaging and, more specifically, to asynchronous image sensor readout with timestamp calibration.

BACKGROUND

Frame-based imagers, which may also be referred to herein as conventional or synchronous operation imagers, are based on the use of a fixed capture interval, as graphically depicted in FIG. 1. In such imagers, all of the pixels within a Region of Interest (ROI) on a Focal Plane Array (FPA) or within the entire FPA are read out at every frame 100. The readout of frame-based imagers includes both spatial and temporal redundancies, as not all significant data has changed between frames. This replication of data and readout of more information than necessary results in data bottlenecks for large format, high frame rate imagers. Furthermore, reading out the entire array every frame results in high storage and power dissipation requirements, with much of the power being wasted transferring redundant information off of the FPA. As imaging formats and frame rates continue to rise, power dissipation of imaging components is fast becoming a significant concern, especially for man-portable devices, Unmanned Aerial Vehicles (UAVs), and low power surveillance systems generally.

Asynchronous imaging, which may also be referred to herein as asynchronous readout, event-driven readout, and event-driven imaging, by capturing scene dynamics as they appear, allows for substantially reduced power dissipation and storage requirements and, as a result, is making inroads in low power, high frame rate, and large format applications and also in machine vision applications. Asynchronous imagers, such as the Dynamic Vision Sensor (DVS) 300 shown in FIG. 3, accomplish this power savings and minimization of storage requirements by avoiding reading out spatial and temporal redundancies in the scene, instead reading out only pixels or groups thereof where a change threshold has been exceeded.

Asynchronous imaging also promises the advantage of providing increased time precision for imaging events. In fact, a key feature of asynchronous imaging is providing a timestamp, either in the pixel or created in an output formatter, associated with a row or a column. This is typically accomplished by comparing the trigger in a pixel with a digital counter or an analog ramp so that the value on the counter or ramp is associated with the address of the pixel. A downside of this approach is that any systematic error between the trigger and the counter or ramp value due to the location of the pixel in the array introduces an error, which limits the precision achieved and/or results in an artifact in the image produced.

These same issues also impact other types of imaging systems, including two dimensional Light Detection and Ranging (LIDAR) systems, flash imaging LIDAR, and 3D flash imaging systems, among other, similar systems. As these systems typically contain pixels that measure and send information concerning the duration during which the pixel was impinged upon by a light source (some also measure the intensity of that light), the accurate correction of any systematic error between the trigger and the counter or ramp value due to the location of the pixel in the array is especially important.

Furthermore, while such systematic errors could be avoided by locating at least one counter or ramp in each pixel, this creates further issues and design constraints. More specifically, counters and ramps are physically large and electrically expensive, relative to other components on a FPA. Incorporating a counter or ramp in each pixel, therefore, would increase the size of the pixel, reduce the space available for other components in the pixel, and increase the energy usage of the FPA, requiring a larger power source and wiring, and, potentially, limiting its applications and useful life (in the case of an FPA that is run off of a battery or other fixed-capacity power source, as may be the case in satellites and remotely operated vehicles).

What is needed, therefore, is a system and/or apparatus for and method of imaging that prevents or reduces the systematic error between the trigger and the counter or ramp value due to the location of a pixel in the focal plane array while maintaining the benefits associated with prior art imaging devices without increasing their physical size or power consumption.

SUMMARY

By mapping the delay between trigger and counter or ramp, where the counter(s) or ramp(s) is located outside of the pixel(s) and in communication with a number of pixels, for each pixel location and using this information to correct the timing error in the timestamp, the systematic error between the trigger and the counter or ramp value due to the location of the pixel in the array is eliminated while maintaining the benefits associated with prior art imaging devices and methods without increasing their size or power consumption.

Such mapped values, which are also herein referred to as correction values are, in embodiments, generated by either synchronized optical or electrical input or by simulation. In embodiments, the correction is carried out by storing a correction value in each pixel, by providing an on-chip circuit with an error map on-chip, or by providing such a map to an image processor provided in a camera of which the focal plane array that hosts the aforementioned elements is disposed.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

As described in the background section, conventional imagers are based on the use of a fixed capture interval followed by a sequential readout, and are herein referred to as frame-based or synchronous imagers 100. In such imagers, a Region of Interest (ROI) or the entire array of pixels 502, the FPA 500, is read out at every frame.

The readout of such conventional, frame-based imagers 100 includes both spatial and temporal redundancies, as not all data has changed between frames. This replication of data and readout of more information than is necessary can result in data bottlenecks for large format high frame rate imagers. Furthermore, reading out the entire array every frame results in high power dissipation requirements, much of which is wasted transferring redundant information off of the FPA, and also results in large storage requirements.

Figure 1:
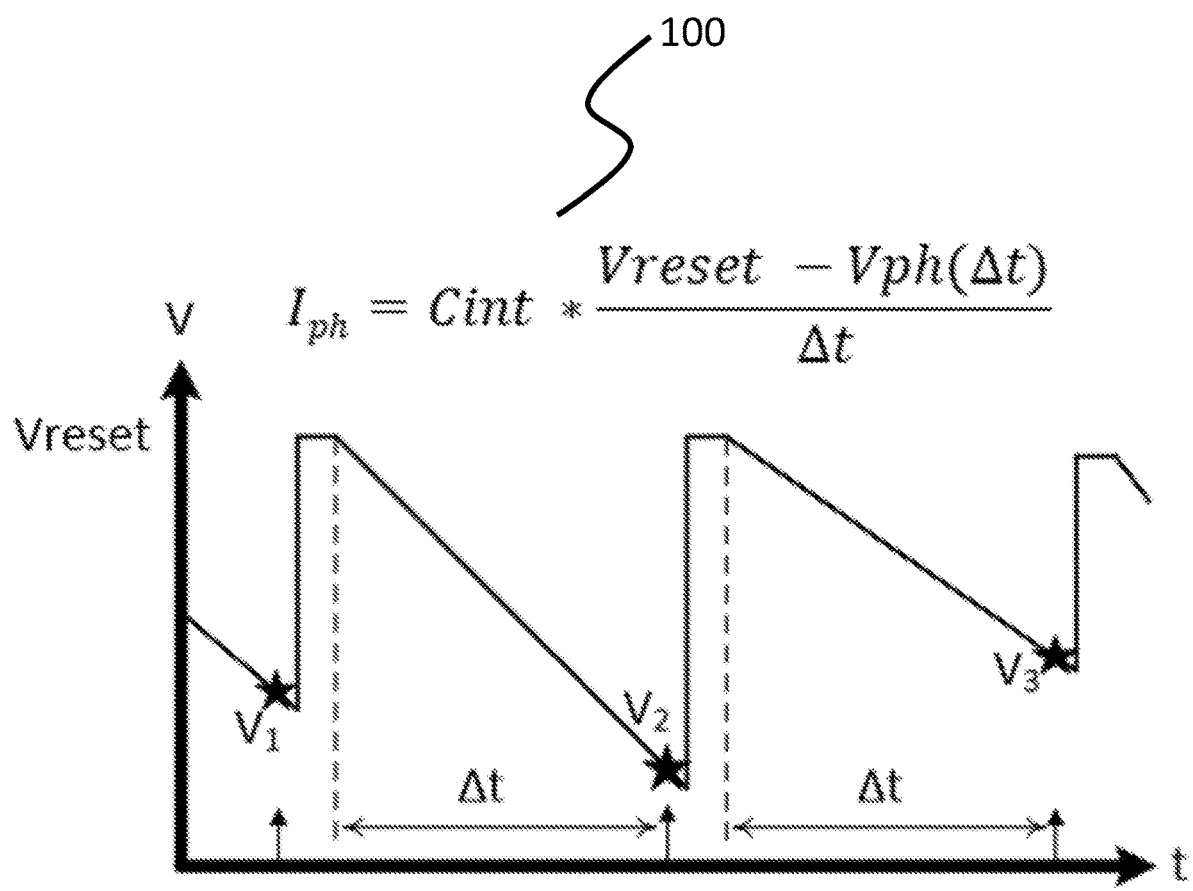
FIG. 1 is a graph describing the behavior of a classical, frame-based pixel.

FIG. 1 describes the function of a classical, frame-based imager 100 graphically. More specifically, frame based imagers 100 measure voltage on a given pixel 502 after a known, fixed time interval, the integration period. Frame-based imagers 100 then quantize the voltage change during the fixed time interval, using it to generate a reproducible image. Notable features of frame-based imagers 100 that can be seen in FIG. 1 include full frame capture at fixed time intervals, including redundant spatial & temporal pixels 502 and continuous clocking of all pixels 502.

Figure 2:
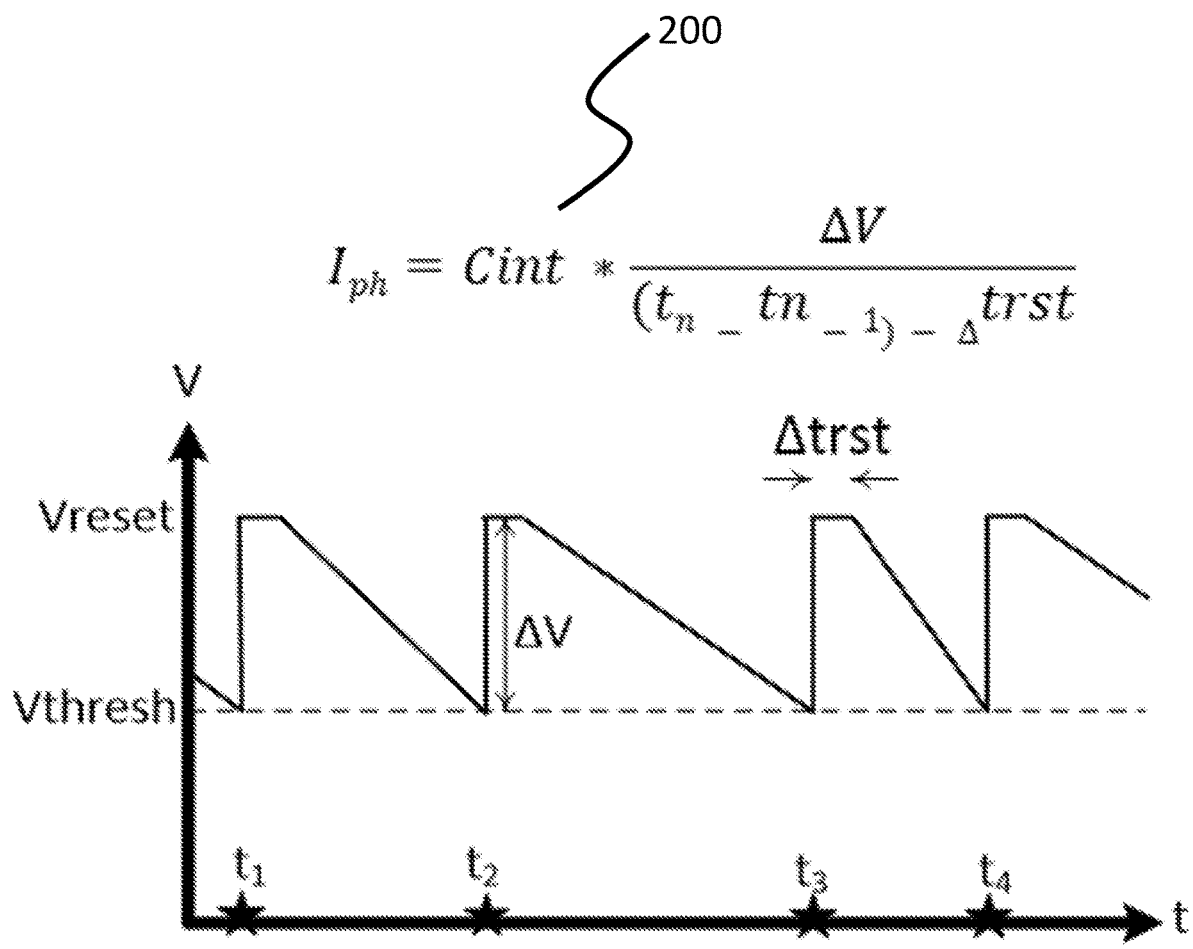
FIG. 2 is a graph describing the behavior of an event-driven pixel.

In contrast to classical, frame-based imagers 100, event-driven or asynchronous imagers 200 as shown in FIG. 2 only send out information, which may include pixel 502 address and a time stamp indicating when a pixel 502 or group thereof has exceeded a predetermined threshold intensity (i.e. when an "event" has occurred). More specifically, event-driven readouts 200 are designed to output pixel 502 information when a temporal change is sensed. This design eliminates both spatial and temporal redundancies, reducing data throughput bandwidth while providing lossless data compression by collecting only unique temporal scene information. This significantly reduces power requirements in the imager and in the FPA signal processing chain.

Event-driven imagers 200, such as the Dynamic Vision Sensor (DVS), operate by measuring the time duration required for the sensor signal to change by a preset amount, effectively quantizing time, as graphically-described in FIG. 2. Such imagers are typically based on pulse modulation, which is used to convert intensity change to time. Events are determined when a predetermined threshold is exceeded, either positive or negative; this is a measure of the temporal contrast. Each pixel 502 event is conveyed to the output with the event arrival time and the pixel 502 location, both row and column indices, and may be referred to as an Asynchronous Event Readout (AER). Directional contrast changes can also be conveyed through the AER using an additional event bit. More than 6-orders of magnitude (>120 dB) dynamic range is possible with such imagers and minimum contrast thresholds as low as 1.5% have been demonstrated.

Furthermore, event-driven imagers 200 only read individual pixels 502 that incur an event, typically using AER, in serial or parallel readout, dependent on design requirements. Because pixels 502 reach the threshold voltage at varying times, readout is asynchronous, immediate, and pixel-specific, as opposed to the FPA-wide readout of a classical, frame-based, synchronous imager 100, conserving bandwidth and power and/or allowing for higher effective framerates, which can be 100's of KHz with response times as short as 3 μs.

Figure 3:
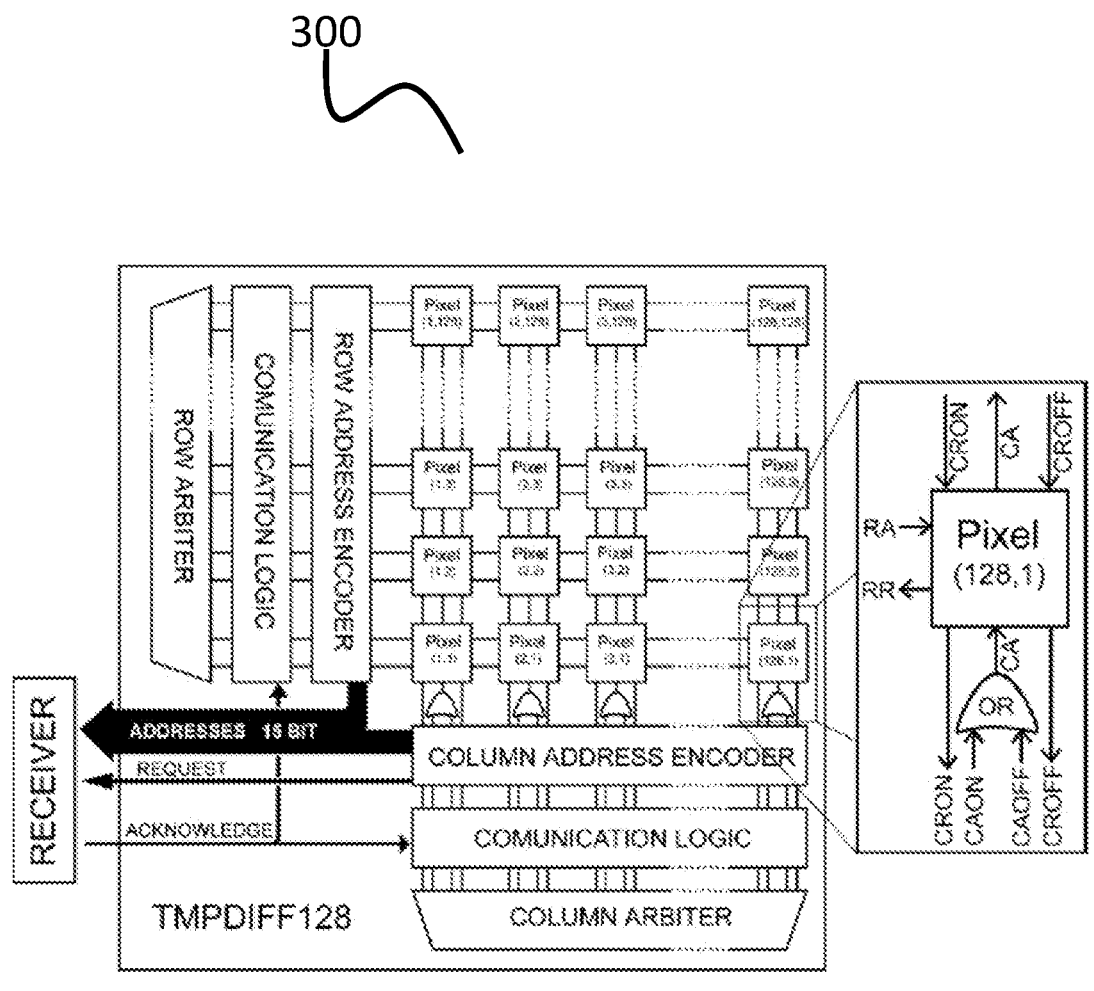
FIG. 3 is a schematic describing a Dynamic Vision Sensor (DVS) type asynchronous imaging circuit.

Asynchronous imagers, such as the Dynamic Vision Sensor (DVS) 300 shown in FIG. 3, comprise an array of pixels 502, but, unlike classical, frame-based imagers 100, do not need to include a system clock. In a common implementation, when there is a change in response in any pixel 502, that change in response triggers a row address encoder and a column address encoder to load the pixel 502 address onto the address bus, which then outputs that information from the array. A timestamp may then be associated with the address externally. Alternatively, the system may receive the information directly and infer a time stamp.

Timestamping of pixel 502 output is typically accomplished by comparing a trigger in the pixel 502 with a digital counter 504 or an analog ramp so that the value on the counter 504 or ramp is associated with the address of the pixel 502. Any systematic error between the trigger and the counter 504 or ramp value due to the location of the pixel 502 in the array results in a recurring error, which limits the precision achieved and/or results in an artifact in the image produced.

These same issues also affect Light Detection and Ranging (LIDAR) systems, which can utilize a similar configuration of a focal plane array 500 comprising a plurality of pixels 502, each pixel 502 comprising a trigger that is in operative communication with a counter 504 or ramp.

A problem in the prior art, which affects LIDAR, Asynchronous Imagers, and other devices, is that the propagation of the reference signal will be non-uniform across the FPA 500. This results in a limitation of precision in the timestamp value. In a proposed embodiment, it is pointed out that this non-uniformity error, whether gradually varying across the FPA 500 or being pixel-by-pixel varying, can be reduced by a calibration step. The result is more precise timing information.

In embodiments of the present disclosure, such problems are resolved by generating a timestamp using a known reference time zero and a predetermined, known time corresponding to the integrated signal on the pixel 502 crossing a threshold and capturing the difference between these two for a given pixel 502. The trigger time, in embodiments, is generated on a pixel-by-pixel basis within each pixel 502. A reference clock 506 and difference can be generated external to the device or they can be generated in the periphery on the device, in embodiments in a buffer 600, such as the memory 600 depicted in FIG. 6. Alternatively, a trigger signal or the reset of a ramp used for the trigger or the reset of a digital counter 504 can be generated in each pixel 502 so that the difference can be generated within each pixel 508 and then output with data pertaining to a threshold-crossing event.

In embodiments, events are missed if multiple events occur simultaneously in the respective row 508 or column 510. This has the advantage that the time information is preserved and decoupled from output timing. In other embodiments, multiple events receive the same time stamps if they occur too closely together along the same row 508 or column 510.

Figure 4:
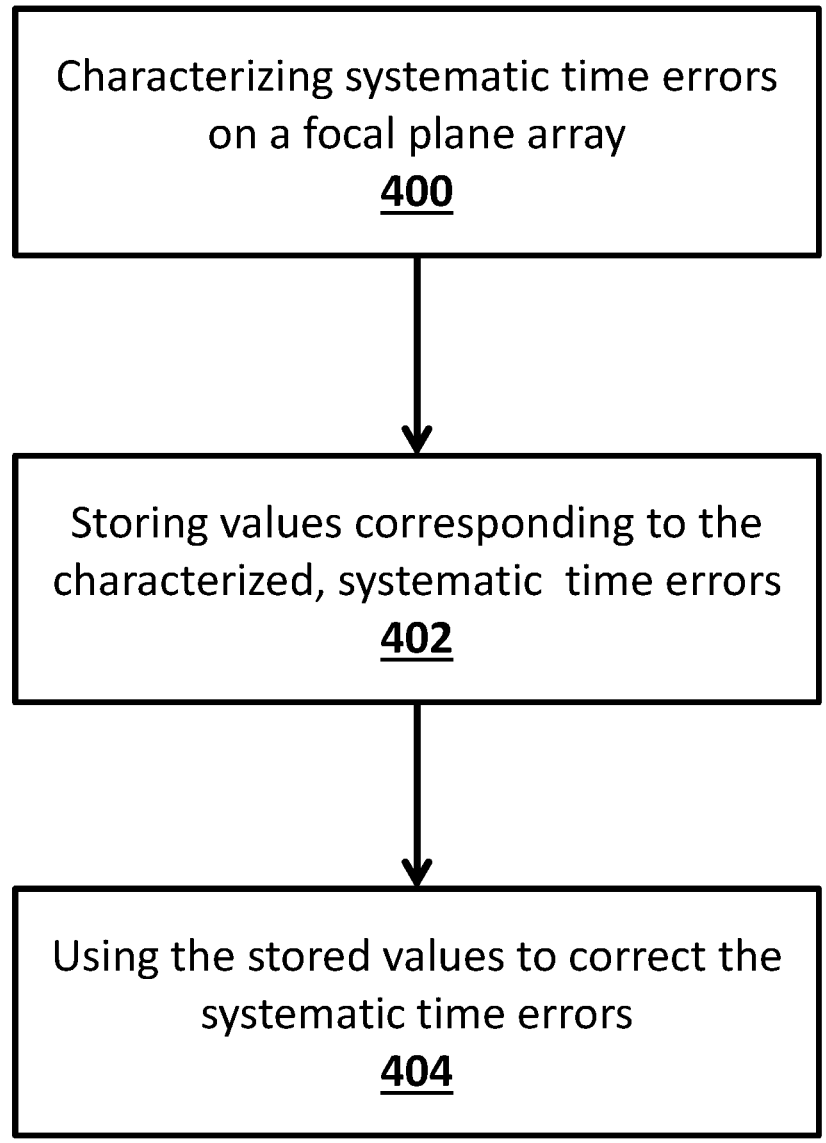
FIG. 4 is a schematic describing an imaging circuit, in accordance with embodiments of the present disclosure.

Now referring to FIG. 4, a flowchart describing a method of imaging in accordance with embodiments of the present disclosure is provided. That method comprises characterizing systematic time errors on a focal plane array 400, storing values corresponding to the characterized, systematic time errors 402, and using the stored value to correct the systematic time errors 404.

For the purposes of this disclosure, systematic time errors should be understood to refer to the pixel 502 to pixel 502 variability in the time it takes data transmitted by those pixels 502 to reach their destination, which, in embodiments, is the periphery of the focal plane array 500 while, in other embodiments, the periphery functions as a pass-through to a system outside of the FPA 500.

Systematic time errors result from different parasitic resistance, capacitance, and, to a lesser extent, inductance in the circuits connecting individual pixel 502 output or, in embodiments, the output of groups of pixels 502, to the next stop in the processing chain (e.g. the periphery of the FPA 500 or the system outside of the FPA 500 for which the periphery of the FPA 500 acts as a pass-through). Such resistance, capacitance, and inductance values, where they are inherent in the circuit, as opposed to being the result of the inclusion of resistors, capacitors, and inductors therein, are herein referred to as parasitics or non-idealities.

In embodiments, systematic errors associated with each pixel 502 are determined using a laser pulse. More specifically, in such embodiments, a laser pulse is emitted such that it impinges upon the FPA 502 at a known time and then a timestamp is assigned to the time that a pixel 502 output associated with the laser pulse reaches its destination. The difference in time between emission of the laser pulse and the time at which a pixel 502 signal arrives at its destination, in embodiments the periphery of the FPA 500 or a system outside of the FPA 500, the time being relative to other pixels 502, is herein referred to as a timing offset (relative timestamp). As each pixel 502 will have a different timing offset, depending on the impact of non-idealities impacting the signal path, in embodiments, a timing offset is associated with each pixel 502 or group of pixels 502.

In other embodiments, a clock tree may be established to determine the per-pixel 502 timing offset. As herein used, a clock tree should be understood to refer to a clock distribution network within a system or hardware design that includes the clocking circuitry and devices from clock source to destination. The complexity of the clock tree and the number of clocking components used depends on the hardware design. Since systems can have several Integrated Circuits (ICs) with different clock performance requirements and frequencies, a "clock tree" refers to the various clocks feeding those ICs. In embodiments, a single reference clock 506 is cascaded and synthesized into many different output clocks, resulting in a circuit diagram that looks a bit like a sideways tree trunk. The "trunk" in such embodiments is the reference clock 506 and the "branches" are the various output clocks.

In embodiments using a clock tree, the clock tree includes a synchronized clock in each pixel 506 and a master clock outside of the pixel array. By comparing a timestamp associated with a pixel 502 output to the time at which the output is received, as recorded by a second clock synchronized to the first, the transmission time can be determined and compared to other pixels 502, providing the relative timing offset between those pixels 502.

In embodiments, the clock tree is only used to determine initial per-pixel timing offsets, to reduce the need to power this circuit during normal usage and because the timing offset is not expected to change during operation of the device.

In embodiments, only the difference between timestamps of different pixels 502 or groups thereof is stored.

In embodiments, using the stored timing offset to correct the systematic time errors 404 is accomplished using a Digital Signal Processor (DSP) or FPGA, which may be located inside or outside of the FPA 500. The DSP or FPGA of such embodiments is in communication with a storage medium containing the systematic time errors, in embodiments, such as that shown in FIG. 6, memory 600. In embodiments, a Non-Uniformity Correction (NUC) module 604 is used to store timing offset values and/or adjust timestamps associated with specific pixels 502 and/or groups thereof based on stored timing values, which may be stored in memory 600, such that time differences arising from non-idealities are accounted for and removed. In embodiments, adjustment of timestamps is done by adding stored timing offsets, subtracting stored timing offsets, or both adding and subtracting stored timing offsets from the timestamp associated with a pixel 502 or a group of pixels 502.

Figure 5:
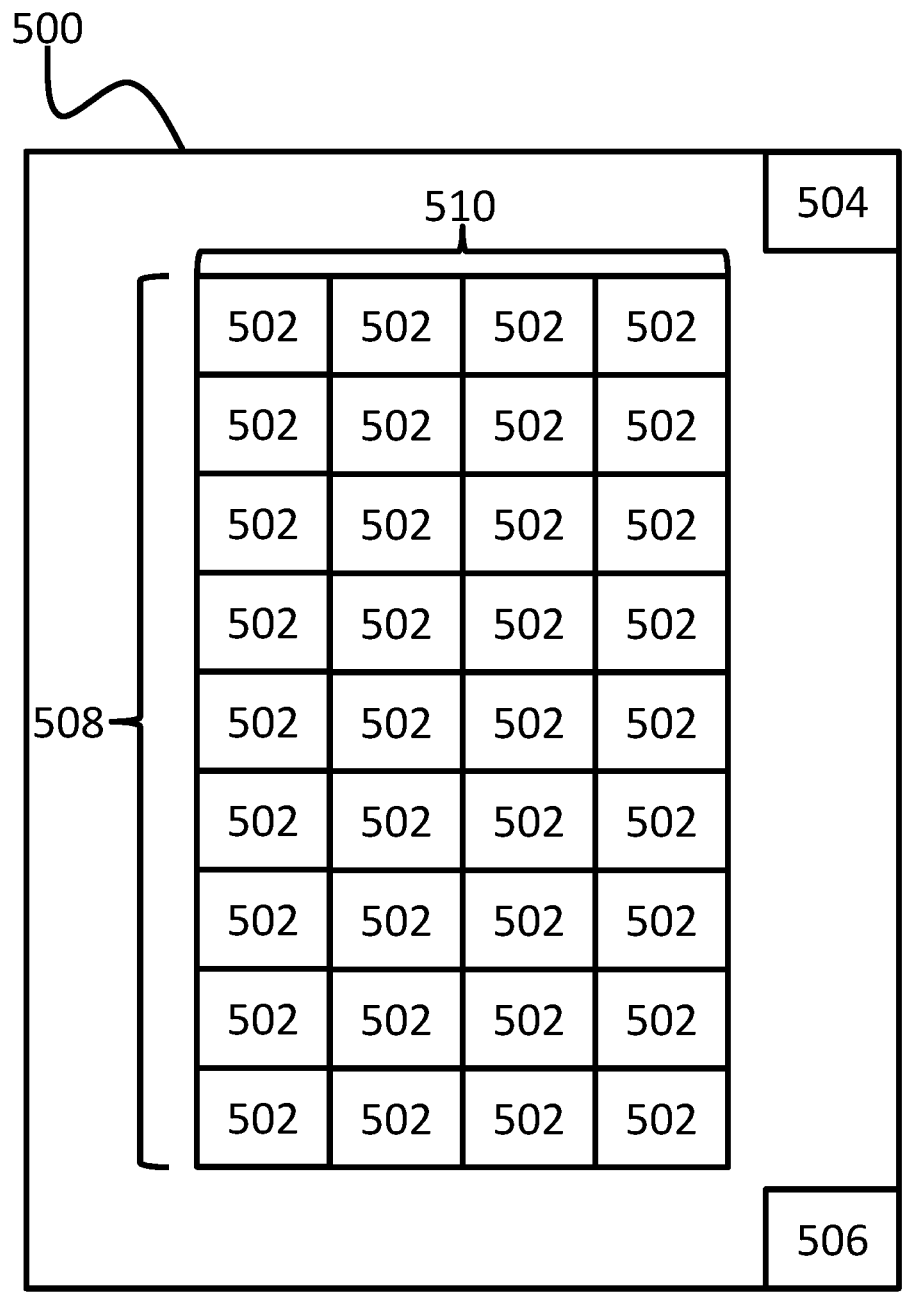
FIG. 5 is a flowchart describing a method of imaging, in accordance with embodiments of the present disclosure.
Figure 6:
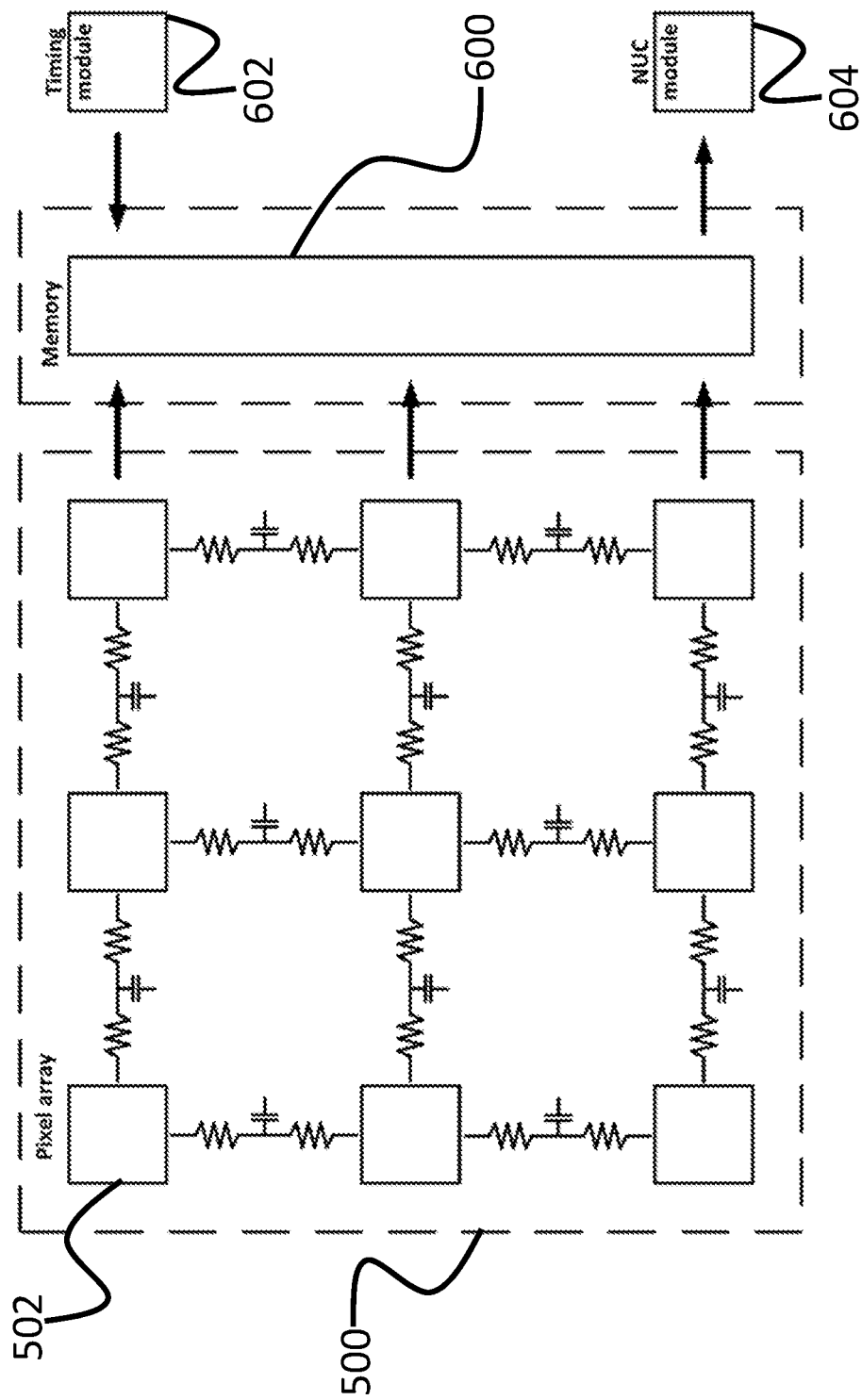
FIG. 6 is a schematic showing a pixel array in communication with a timing module and non-uniformity correction module through memory, in accordance with embodiments of the present disclosure.

An exemplary imaging circuit, in accordance with embodiments of the present disclosure, is provided in FIG. 5. The improved imaging circuit comprises a focal plane array 500 comprising a plurality of pixels 502, each of which is in operative communication with at least one counter 504 or ramp and, in embodiments, at least one reference clock 506. FIG. 6 shows a version of this circuit where timing and non-uniformity correction are performed outside of the pixel 502 array by a timing module 602 and non-uniformity correction module 604 respectively, each of which is in communication with storage, in embodiments memory 600 that can be used, inter alia, to store timing offsets.

In embodiments, by placing the at least one counter 504 or ramp outside of the pixels 502 of the focal plane array 500 and associating multiple pixels 502 or groups of pixels 502 with a single counter 504 or ramp, the imaging circuit is made simpler, more efficient (in terms of power consumption), and can be made smaller.

In embodiments, the counter 504 or ramp and/or reference clock 506 are located on the focal plane array 500 while, in other embodiments, the counter 504 or ramp and/or reference clock 506 are located remotely from the focal plane array 500. In embodiments, the imaging circuit generates a timestamp on-chip through the use of a trigger circuit, a running counter 504 or ramp and a digital latch. The latch, in embodiments, is located in a row 508 encoder or a column 510 encoder located on the focal plane array 500.

In embodiments having latches in a row 508 or a column 510 encoder, as a pixel 502 is triggered, it sends a signal to the periphery of the FPA 500. The periphery of the FPA 500, more specifically either a row 508 or column 510 encoder contained within the periphery of the FPA 500, captures the time the signal was received. This signal stays high until its receipt is confirmed, either by the row 508 or column 510 encoder. Once the triggered pixel 502 receives confirmation that its signal has been received, it ceases to output that signal to the row 508 or column 510 encoder and then transmits the same or a similar signal over the opposite bus. For example, if the initial signal was sent to the row 508 encoder, the subsequent signal is send to the column encoder. In this way, the position of the pixel responsible for the transmission on the FPA 500 can be identified.

Alternatively, each pixel 502 can include identifying information in its signal obviating the need for the more complex identification procedure described in the preceding paragraph. In embodiments, this is accomplished through multiplexing and subsequent demultiplexing of the signal.

In other embodiments, the latch is located in each pixel 502 or group of pixels. The advantage of this is that two pixels 502 or groups of pixels 502 recording events at the same time (in the case of asynchronous imagers) can each record their respective event and an arbitrator can then read them out sequentially with the timestamp for each associated with the proper address. That is, time information is preserved and decoupled from when the address is put on the address bus.

In embodiments, the trigger is a circuit comprising at least one capacitor, where the circuit is configured such that the at least one capacitor reaching a preset voltage threshold results in a signal output that may be used to trigger a predefined action. In embodiments, the predefined action triggered by the trigger circuit comprises the incrementing of a counter 504 or ramp. In embodiments, the counter 504 is a latch or flip-flop, an array thereof, or a ramp.

By providing a reference clock 506 that is used to generate error values representing the timing offset for each pixel 502 and then using this error value to correct for the timing offset pixel 502 to pixel 502, the systematic errors associated with prior art asynchronous imagers is avoided. In embodiments, the reference clock 506 is a part of the FPA 500 while, in other embodiments, it is an external reference clock 506, which may also be referred to as a timing module, while, in still other embodiments it is an external laser pulse.

In embodiments, the correction is carried out by outputting a map of the error values which is then used in an off-chip signal processing chain.

In embodiments, the correction is stored in each pixel 502, to be used locally to correct timing.

By mapping the delay between the trigger and counter 504 or ramp for each pixel 502 location and using this information to correct the timing error in the timestamp, the systematic error between the trigger and the counter 504 or ramp value due to the location of the pixel 502 in the FPA 500 is eliminated while maintaining the benefits (e.g. low power, efficient bandwidth utilization, and minimization of storage requirements) associated with asynchronous imaging.

Such mapped values, which are also herein referred to as correction values, in embodiments, are generated by either synchronized optical or electrical input or by simulation. In embodiments, the correction is carried out by storing a correction value in each pixel 502, by providing an on-chip circuit with an error map on-chip, or by providing such a map to an image processor provided in a camera of which the focal plane array 500 that hosts the aforementioned elements is disposed.

The teachings of the present disclosure can be realized in the system encompassing the event-driven embodiment described so as also to be applicable to LIDAR (Light Detection and Ranging) for terrain mapping or range map imaging, to the construction and operation of communication arrays, and to other applications requiring precise timing and avoidance of timing errors.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. An imager, the imager comprising:
   a focal plane array comprising a plurality of pixels;
   at least one storage device in communication with said focal plane array;
   at least one timing module in communication with said focal plane array; and
   at least one non-uniformity correction module in communication with said focal plane array,
   wherein the at least one storage device is configured to store at least one error value that represents a timing offset associated with a specific pixel or group of pixels,
   wherein the at least one timing module is configured to timestamp data received from a pixel or group of pixels,
   wherein the non-uniformity correction module is configured to alter the timestamp provided by the at least one timing module using the error value associated with the pixel or group of pixels, and
   wherein the timing offset represents a difference in transmission time between a pixel or group of pixels to a destination, relative to other pixels in the focal plane array, that results from non-idealities.

2. The imager of claim 1, wherein the focal plane array is in operative communication with at least one timing module configured to provide a synchronized reference time to each of the plurality of pixels and/or groups of pixels.

3. The imager of claim 2, wherein the at least one timing module is a reference clock external to the focal plane array.

4. The imager of claim 2, wherein the at least one timing module comprises a clock tree.

5. The imager of claim 1, wherein each pixel or group of pixels comprises a separate storage device configured to store at least one error value that represents a timing offset associated with the specific pixel or group of pixels in which it is disposed.

6. The imager of claim 1 wherein the timing module comprises a clock tree.

7. The imager of claim 1, wherein the at least one storage device is located outside of the plurality of pixels and comprises a plurality of error values, each error value corresponding to a specific pixel or a specific group of pixels.

8. The imager of claim 1 wherein the storage device is in operative communication with an off-chip signal processing chain configured to utilize the information contained on said storage device to correct timing errors affecting at least one of the pixels on the focal plane array.

9. The imager of claim 1, further comprising at least one trigger circuit located in each pixel or group of pixels, at least one running counter or ramp, and at least one digital latch.

10. The imager of claim 9 wherein the trigger circuit comprises at least one capacitor and is configured such that the at least one capacitor reaching a preset voltage threshold results in a signal output that is used to increment the counter or ramp.

11. The imager of claim 9 wherein the imager, using the trigger circuit, a running counter or ramp, and a digital latch, is configured to generate at least one timestamp applicable to a pixel or group of pixels and to use the error value associated with that pixel or group of pixels to correct the timestamp applicable to that pixel or group of pixels by removing the error associated with that timestamp.

12. The imager of claim 9 wherein each latch is located in a row encoder or column encoder.

13. The imager of claim 9 wherein each latch is located in a pixel or group of pixels.

14. The imager of claim 13 wherein each pixel or group of pixels comprises a latch.

15. The imager of claim 1 wherein the at least one storage device is located remotely from the imager.

16. A method of minimizing the temporal error between pixels or groups of pixels on a focal plane array, the method comprising:
   on a focal plane array comprising at least two pixels or groups of pixels, at least one counter or ramp, and at least one trigger:
   determining the timing error associated with a time stamp associated with the at least two pixels or groups of pixels;
   storing the timing error associated with the at least two pixels or groups of pixels and the pixel or pixel group location; and
   using the stored timing error and pixel or pixel group location to correct subsequent time stamps associated with the at least two pixels or groups of pixels, wherein the timing error corresponds to a systematic error between the trigger and the counter or ramp value due to the location of a pixel or group of pixels on the focal plane array.

17. The method of minimizing the temporal error between pixels or groups of pixels on a focal plane array of claim 16 wherein the timing error is determined using synchronized optical input.

18. The method of minimizing the temporal error between pixels or groups of pixels on a focal plane array of claim 16 wherein the timing error is determined using synchronized electrical input.

19. The method of minimizing the temporal error between pixels or groups of pixels on a focal plane array of claim 16 wherein the timing error is determined using simulation.

20. The method of minimizing the temporal error between pixels or groups of pixels on a focal plane array of claim 16 wherein timing error information and corresponding pixel location information is stored in each pixel.

21. The method of minimizing the temporal error between pixels or groups of pixels on a focal plane array of claim 16 wherein timing error information and corresponding pixel location information is stored remotely from the focal plane array.

* * * * *